United States Patent
Ritz

(10) Patent No.: US 7,967,373 B2
(45) Date of Patent: Jun. 28, 2011

(54) VEHICLE BODY OF A MOTOR VEHICLE WITH A FRONT-END MODULE

(75) Inventor: Thomas Ritz, Nufringen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 240 days.

(21) Appl. No.: 12/428,503

(22) Filed: Apr. 23, 2009

(65) Prior Publication Data

US 2009/0267384 A1  Oct. 29, 2009

(30) Foreign Application Priority Data

Apr. 23, 2008 (DE) .................. 10 2008 020 304

(51) Int. Cl.
*B60N 99/00* (2006.01)

(52) U.S. Cl. .................................. 296/193.09

(58) Field of Classification Search ............. 296/193.01, 296/193.03, 193.04, 193.09, 203.01, 203.02
See application file for complete search history.

(56) References Cited

U.S. PATENT DOCUMENTS

| | | | | |
|---|---|---|---|---|
| 6,227,321 B1* | 5/2001 | Frascaroli et al. | ....... | 296/203.02 |
| 6,375,252 B1* | 4/2002 | Cheron et al. | ......... | 296/203.02 |
| 6,517,146 B1* | 2/2003 | Cheron et al. | ......... | 296/203.02 |
| 6,729,008 B2* | 5/2004 | Nishijima | ............... | 296/203.02 |
| 7,048,326 B2* | 5/2006 | Yasui | ..................... | 296/203.02 |
| 7,097,239 B2* | 8/2006 | Lazzeroni | ............... | 296/203.01 |
| 7,278,680 B2* | 10/2007 | Burnham | ................ | 296/193.09 |
| 7,347,489 B2* | 3/2008 | Ziaja et al. | .............. | 296/193.03 |

FOREIGN PATENT DOCUMENTS

| | | |
|---|---|---|
| DE | 19919258 C2 | 11/2000 |
| DE | 69814909 T2 | 4/2004 |
| DE | 10335257 A1 | 3/2005 |
| EP | 1036730 A2 | 9/2000 |
| WO | 9921748 A1 | 5/1999 |
| WO | 2005012066 A1 | 2/2005 |

OTHER PUBLICATIONS

German Office Action dated Apr. 21, 2009.

\* cited by examiner

*Primary Examiner* — Lori L Lyjak

(57) ABSTRACT

A transversely aligned support part is arranged between an assembly support of a vehicle body and a front part. The support part is connected to the assembly support via bolt and clip elements, and the front part is fastenable to the support part by bolts in a manner such that it can be vertically aligned via adjusting elements.

9 Claims, 5 Drawing Sheets

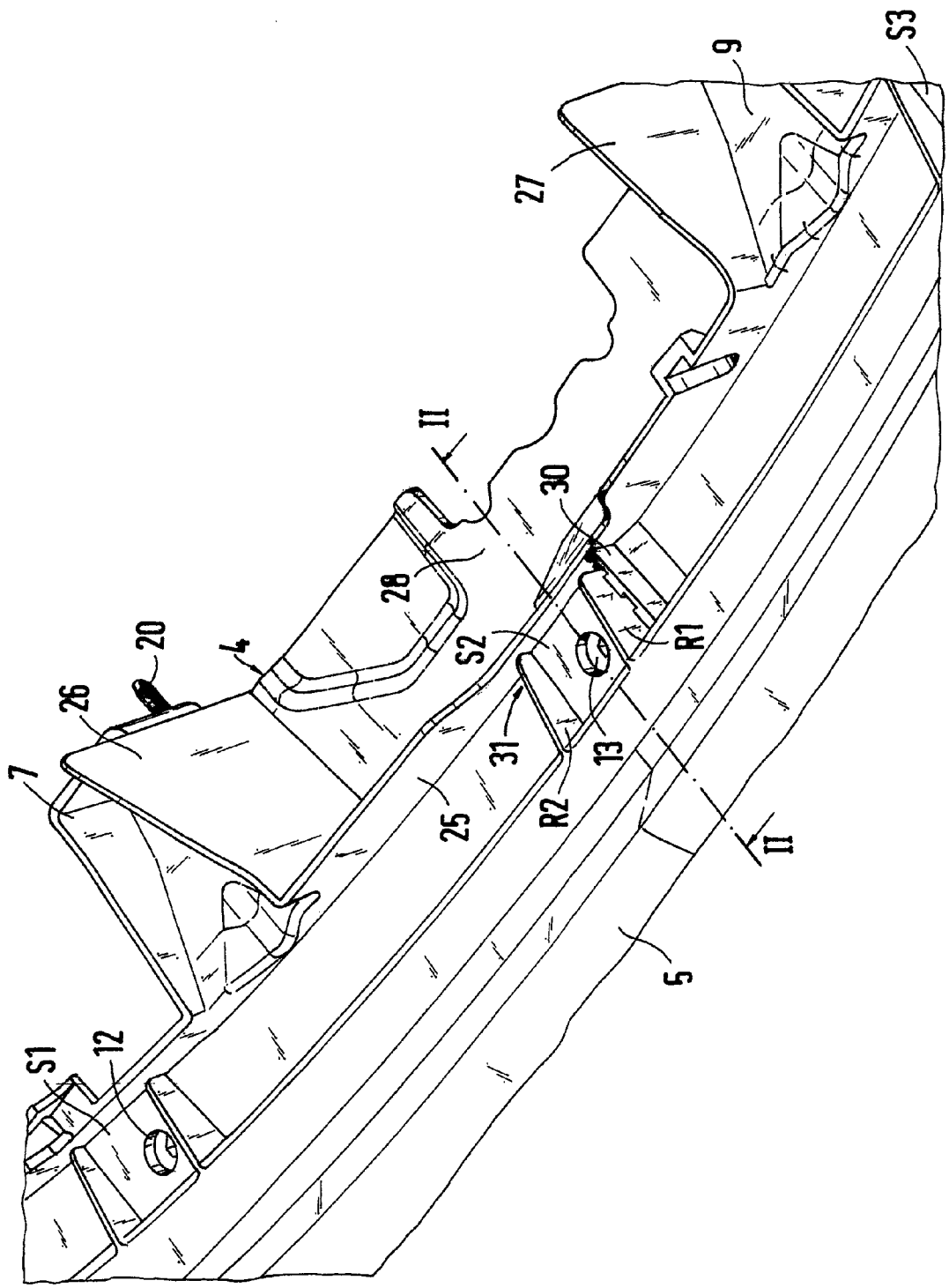

VEHICLE BODY OF A MOTOR VEHICLE WITH A FRONT-END MODULE

CROSS-REFERENCE TO RELATED APPLICATION

This application claims the priority, under 35 U.S.C. §119, of German application DE 10 2008 020 304.1, filed Apr. 23, 2008; the prior application is herewith incorporated by reference in its entirety.

BACKGROUND OF THE INVENTION

Field of the Invention

The invention relates to a vehicle body of a motor vehicle, with a front-end module, which has an assembly support between lateral panels, and contains an outer paneling part forming a front-end region, or a front part on the front side.

German patent DE 199 19 258 C2 discloses a front-end module for a vehicle body, which module has, between lateral longitudinal members, an assembly support which accommodates at least a radiator, headlights, a bumper cross member and an outer paneling part which forms a front-end region. Furthermore, a lock cross member is held on the assembly support.

SUMMARY OF THE INVENTION

It is accordingly an object of the invention to provide a vehicle body of a motor vehicle with a front-end module that overcomes the above-mentioned disadvantages of the devices of this general type, which allows positioning of the front part precisely in the vehicle body in a simple manner in terms of installation and furthermore at the same time to protect a hood lock region against unauthorized access.

With the foregoing and other objects in view there is provided, in accordance with the invention, a vehicle body of a motor vehicle. The vehicle body contains lateral panels, a front-end module having an assembly support disposed between the lateral panels, an outer paneling part defining a front part on a front side, bolts, clip elements, vertically alignable adjusting elements, and a transversely aligned support part disposed between the assembly support of the vehicle body and the front part. The support part is connected to the assembly support via the bolts and the clip elements, and the front part is fastened to the support part by the bolts via the vertically alignable adjusting elements.

The advantages primarily obtained with the invention relate in that a front part can be installed in a simple manner and can be aligned with respect to the bodywork or the vehicle body via a support part which is additional to the assembly support. This is advantageously achieved in that a transversely aligned support part is arranged between the assembly support of the vehicle body and the front part. The support part is connected to the assembly support via bolt and clip elements, and the front part is fastenable to the support part by bolts via vertically alignable adjusting elements. The support part in this case has fastening domes for the bolts, which fastening domes are arranged in a horizontal plane on an inner contour—with regard to the direction of travel—and are aligned with the assembly support, and vertically arranged adjusting elements are arranged in a web region on the upper side of the support part in order to fasten the front part to and align the front part with the support part via web extensions on the front side. The vertically alignable adjusting elements in the support part and the fastening of the front part in the adjusting elements give rise to the possibility of appropriately aligning the front part in all directions, such as in the transverse, longitudinal and vertical directions.

The support part, by its outer contour—with regard to the direction of travel—faces and matches an inner contour of the front part, with the support part being held on the inside at a distance from the assembly support via the fastening domes. The length of the fastening domes advantageously results in the contour on the front side of the support part being able to be matched to the inner contour of the front part. The clearance which is formed between the assembly support and the support part, in particular in the region of the longitudinal center plane of the vehicle, gives rise to the further advantage that the hood lock and the corresponding Bowden cables can be accommodated and can be protected all the way around to the outside against unauthorized access. For this purpose, a planar, upright covering panel and upright, further covering panels adjoining on both sides and also a horizontal covering on the lower side are provided on the support part, the parts surrounding the hood lock and the Bowden cables on the assembly support in an encapsulating manner.

The support part is provided with at least one fastening dome on both sides and in the longitudinal center plane of the vehicle, with clip elements being arranged at each of the free ends of the support part for the pre-installation. The clip elements engage in corresponding receiving openings with the assembly support. The clip elements which are arranged on the end sides serve to hold the support part in a pre-installation position on the assembly support so that the bolted connection to the assembly support can subsequently be undertaken. Furthermore, it is also possible for fixing pins to be provided on the domes, the fixing pins engaging in corresponding receiving openings in the assembly support to provide precise positioning.

In addition to the fixing of the support part to the assembly support via the height-adjustable adjusting elements which, in the support part, contain, for example, height-adjustable threaded bushes which are provided in the longitudinal center plane of the vehicle and on both sides, "fixing ribs" are also arranged on the support part in the longitudinal center plane of the vehicle on both sides of the adjusting element. The fixing ribs are arranged in a manner corresponding to an insertable web section which is on the front side and has corresponding ribs as a receiving element for a bolt. The two further adjusting elements in the web of the support part are arranged in a planar section without fixing boundaries so that overstressing during the installation is avoided.

The front part is held in the Y direction (transverse direction) between the fixing ribs of the support part via the web extension as a receiving element for a bolt on the front part, and, furthermore, the front part is arranged in the support part in a manner such that it can be vertically aligned in the z direction (vertical direction) via the adjusting elements. Vertical fixing and fixing in the transverse direction and, by the arrangement of the support part on the assembly support, fixing in the longitudinal direction of the vehicle is therefore advantageously possible.

Other features which are considered as characteristic for the invention are set forth in the appended claims.

Although the invention is illustrated and described herein as embodied in a vehicle body of a motor vehicle with a front-end module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6 is a diagrammatic, partial top perspective view of fixing ribs on the support part with a fixed arrangement of a web extension on the front part.

DETAILED DESCRIPTION OF THE INVENTION

Figure 1:
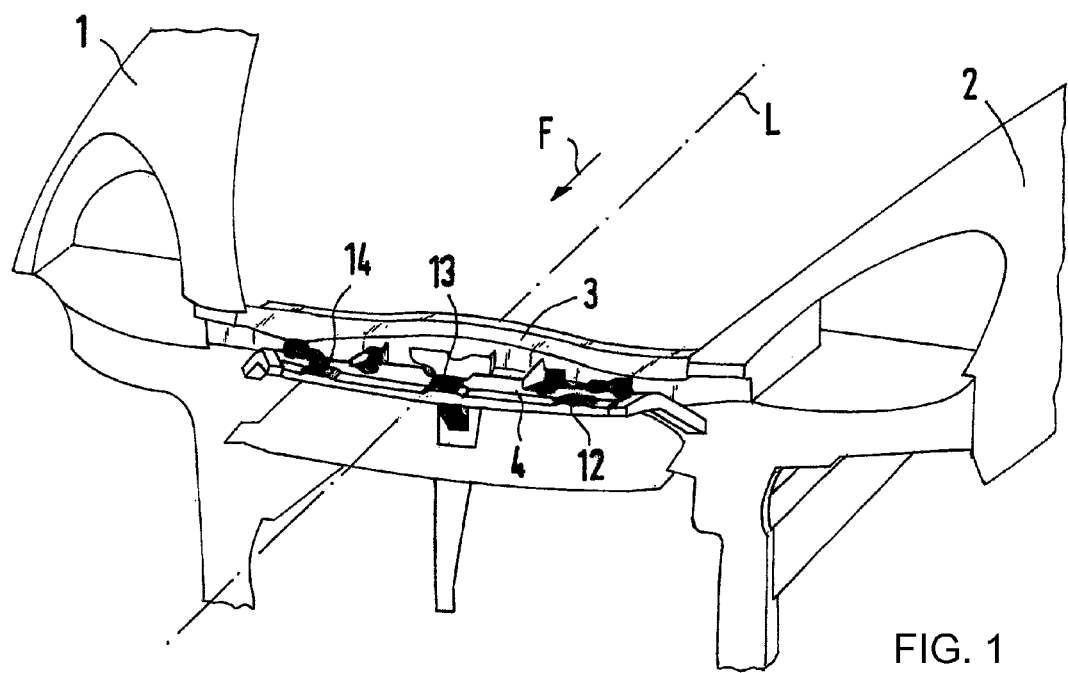
FIG. 1 is a diagrammatic, perspective view of a front of a motor vehicle with an assembly support and transversely arranged support part according to the invention.
Figure 2:
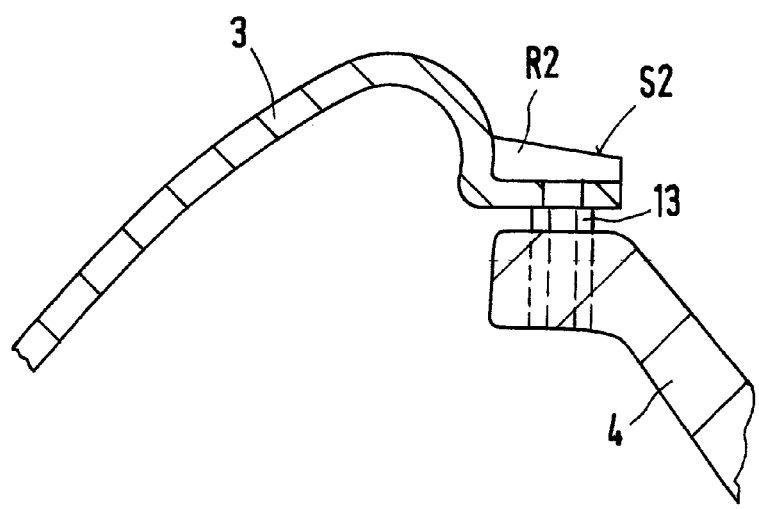
FIG. 2 is a sectional view taken along the line II-II shown in FIG. 6 through a vertically alignable adjusting element.
Figure 4:
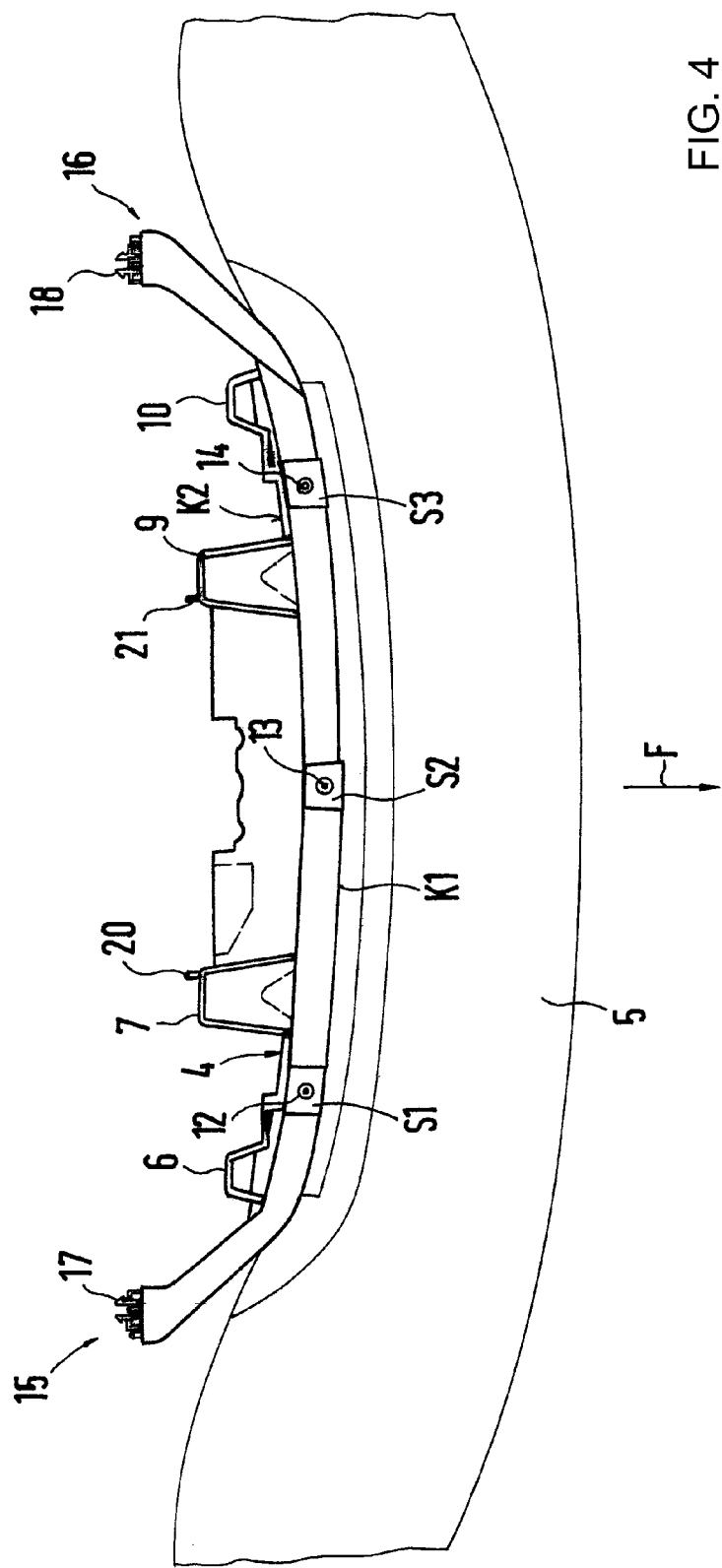
FIG. 4 is a diagrammatic, top view of the support part released from the assembly support, with the front part connected.

Referring now to the figures of the drawing in detail and first, particularly, to FIG. 1 thereof, there is shown a front vehicle body. The front vehicle body generally contains, between two panels 1 and 2, an assembly support 3 which is connected on a front side—with regard to a direction of travel F—to a support part 4 to which a front part 5 is fastened (FIG. 4).

Figure 3:
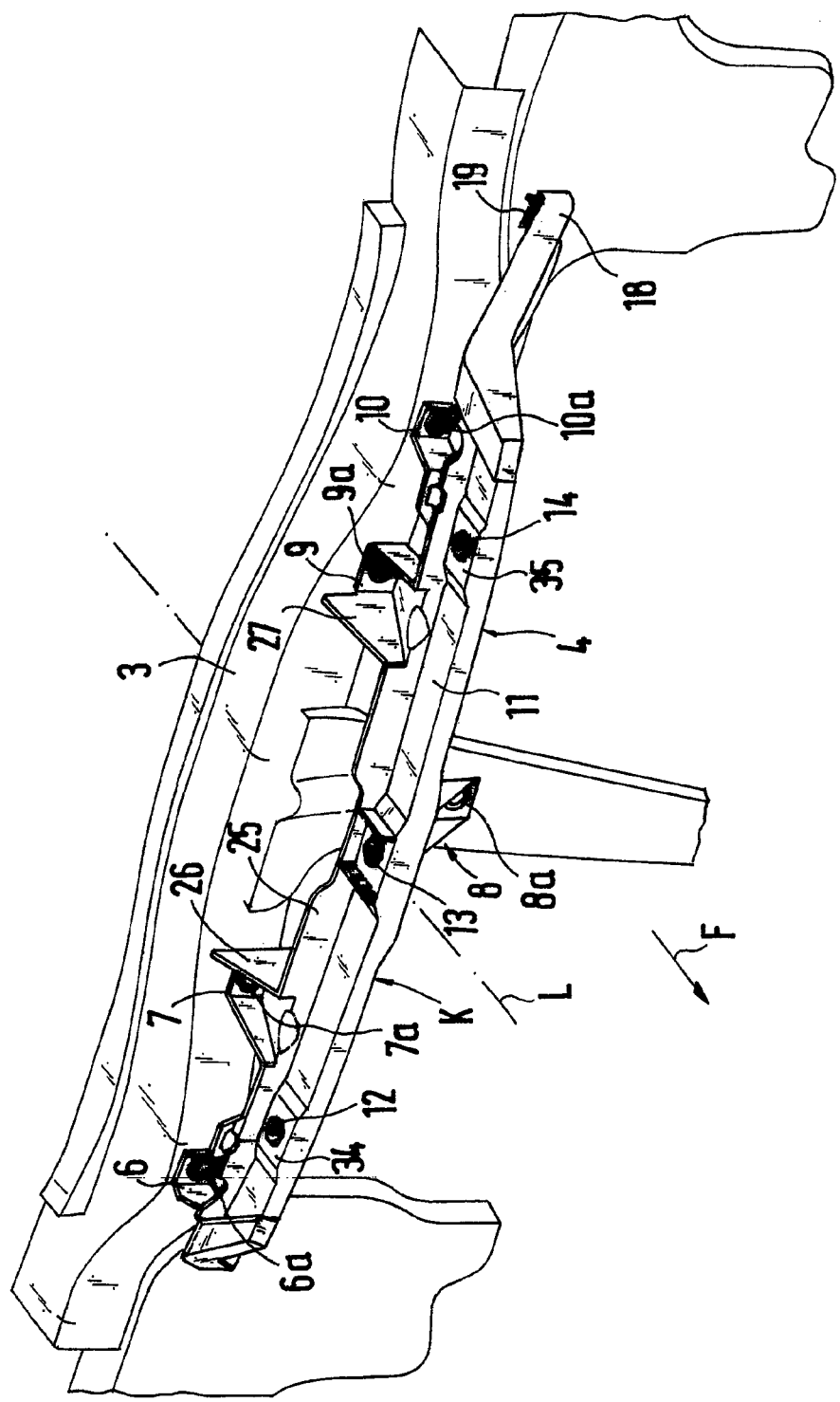
FIG. 3 is a diagrammatic, perspective view of the adjusting element shown in FIG. 2.

The support part 4 has fastening domes 6, 7, 8, 9 and 10 which are arranged in a horizontal plane and are aligned with the assembly support 3 and via which the support part 4 can be fastened to the assembly support 3 by bolts 6a to 10a (FIG. 3).

The fastening domes are dimensioned in length in such a manner that an outer contour K of the support part 4 is matched to an inner contour K1 of the front part 5. Vertically alignable adjusting elements 12, 13, 14, which may contain threaded bushes, for example, are embedded in a web 11 of the support part 4 (FIG. 4).

The fastening domes 6, 7 and 9, 10 are arranged on both sides of a longitudinal center plane L of the vehicle, and the fastening dome 8 is arranged in the longitudinal center plane of the vehicle. The vertically alignable adjusting element 12 is arranged between the fastening domes 6 and 7, and a further adjusting element 14 is arranged between the fastening domes 9 and 10, with a third adjusting element 13 lying in the longitudinal center plane L of the vehicle.

"Clip elements" 17, 18 are integrally formed on free ends 15, 16 of the support part 4 for pre-installation, the clip elements each facing a receiving opening 19 in the assembly support 3 (see FIGS. 3 and 4). Furthermore, protruding pins 20, 21, which precisely position the support part 4 in a predetermined position with respect to the assembly support 3, are provided on the fastening domes 7, 9.

The front part 5 is connected to the support part 4 via the vertically alignable adjusting elements 12, 13, 14 in the support part 4. For this purpose, the front part 5 has horizontally protruding web extensions S1, S2 and S3 which are arranged in a corresponding manner to the adjusting elements 12, 13, 14 for fastening via the bolts. The web extension S2 which is arranged in the longitudinal center plane L of the vehicle has lateral ribs R1 and R2 (FIG. 6) which are held in position between longitudinally running fixing ribs 30, 31 and a transversely running fixing rib 32 of the adjusting element 13. By contrast, the further adjusting elements 12 and 14 have a planar section 34, 35 (FIG. 3) for the further web extensions S1 and S3.

Figure 5:
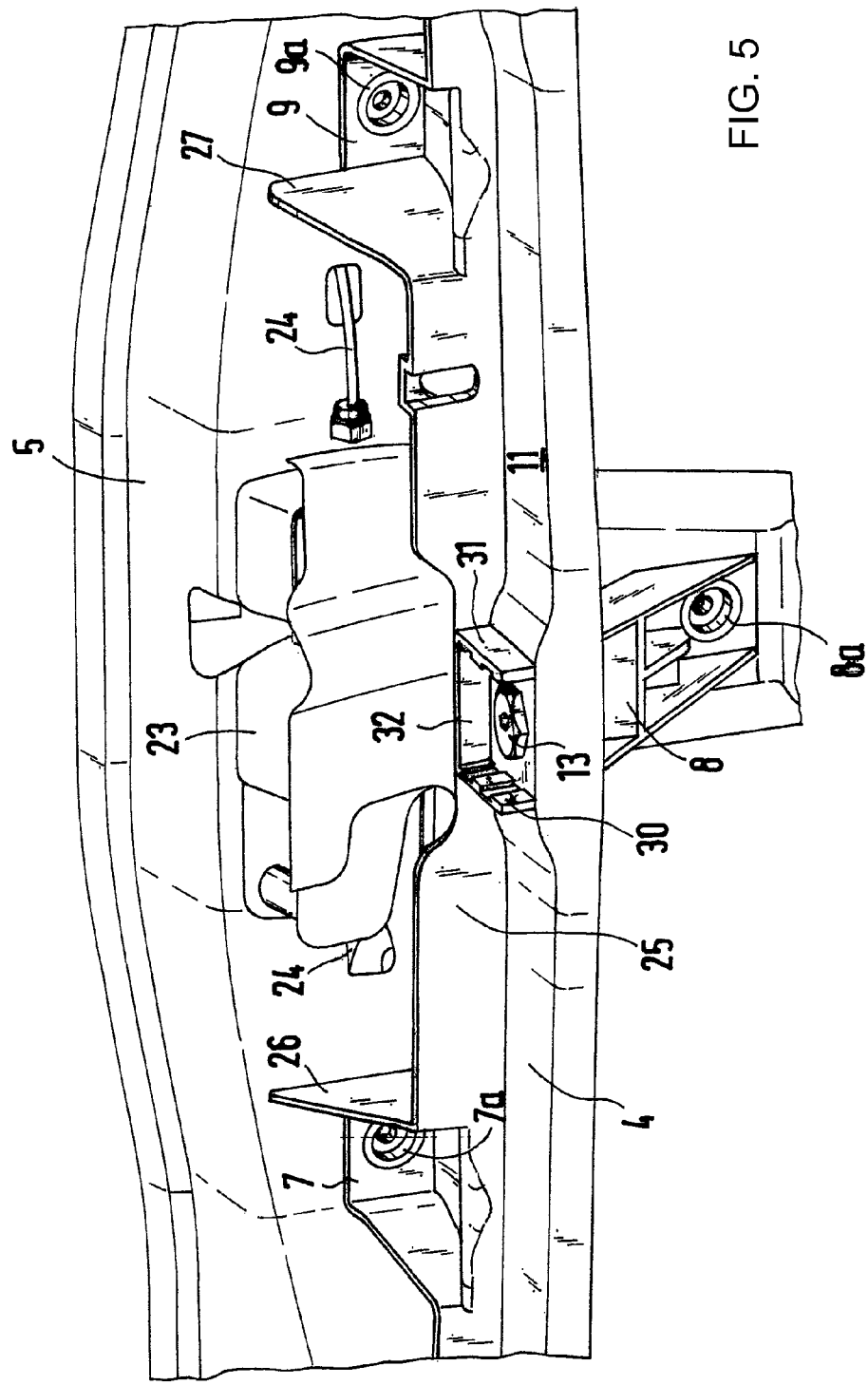
FIG. 5 is a diagrammatic, perspective view of a hood lock which is held on the assembly support and has Bowden cables and a covering panel, which is arranged in front of the hook lock, on the support part.

A hood lock 23 which is held on the assembly support 3 and has Bowden cables 24 is arranged between the support part 4 and the assembly support 3 (FIG. 5). For the outer covering, the support part 4 has, on the web 11, a transversely directed, upright covering panel 25 and further upright covering panels 26, 27 aligned longitudinally on both sides, and a horizontally aligned lower covering panel 28, the parts surrounding the lock 23 with the Bowden cables.

The front part 5 is installed, for example, in a manner such that the support part 4 is aligned on the assembly support 3 and, pre-positioned via the clip elements 17, 18, is attached by the pins 20, 21 and is subsequently fastened via the bolts 6a to 10a. The front part 5 is subsequently attached, with the adjusting elements 12 to 14 determining the position of the front part 5 in the support part 4. After correspondingly precise positioning of the front part 5 in the vertical, longitudinal and transverse directions toward the vehicle body, fastening to the support part 4 takes place via the bolts.

The invention claimed is:

1. A vehicle body of a motor vehicle, the vehicle body comprising:
   lateral panels;
   a front-end module having an assembly support disposed between said lateral panels;
   an outer paneling part defining a front part on a front side;
   bolts;
   clip elements;
   vertically alignable adjusting elements; and
   a transversely aligned support part disposed between said assembly support of said vehicle body and said front part, said support part connected to said assembly support via said bolts and said clip elements, and said front part being fastened to said support part by said bolts via said vertically alignable adjusting elements.

2. The vehicle body according to claim 1, wherein:
   said support part has an inner contour and fastening domes for receiving said bolts, said fastening domes are disposed in a horizontal plane on said inner contour—with regard to a direction of travel—and are aligned with said assembly support;
   said support part has a front side with web extensions; and
   said support part has a web on an upper side, said vertically alignable adjusting elements are disposed in said web to fasten said front part to and to align said front part with said support part via said web extensions.

3. The vehicle body according to claim 2, wherein said support part has an outer contour and by means of said outer contour—with regard to the direction of travel—faces and matches an inner contour of said front part, and said support part is held at a distance from said assembly support via said fastening domes.

4. The vehicle body according to claim 1, wherein:
   said support part has at least one fastening dome on both sides and in a longitudinal center plane of the motor vehicle;
   said assembly support has receiving openings formed therein; and said support part has free ends supporting said clip elements for assisting in pre-installation, said clip elements each facing an aligned one of said receiving openings in said assembly support.

5. The vehicle body according to claim 1,
further comprising a hood lock having Bowden cables; and
wherein said support part has a front, upright, planar covering panel and in each case laterally adjoining, upright covering panels and a horizontal covering on a lower side, and together enclose said hood lock with said Bowden cables on said assembly support in an encapsulating manner.

6. The vehicle body according to claim 2, wherein said adjusting elements in said support part contain height-adjustable threaded bushes which are disposed in a longitudinal center plane of the motor vehicle and on both sides of the motor vehicle.

7. The vehicle body according to claim 6, wherein:
said front part has two lateral fixing ribs and a rear terminating rib, and said ribs are disposed in a manner corresponding to an insertable web extension having lateral ribs as a receiving element for one of said bolts; and
one of said adjusting elements which is disposed in the longitudinal center plane of the motor vehicle is surrounded by said two lateral fixing ribs and said rear terminating rib.

8. The vehicle body according to claim 7, wherein two further ones of said adjusting elements in said web of said support part are disposed in a planar section without fixing boundaries.

9. The vehicle body according to claim 7, wherein said front part is held in a transverse direction between said lateral fixing ribs of said supporting part via said insertable web extension as a receiving element for said bolts on said front part, and in that said front part is disposed in said support part in a manner such that it can be vertically aligned in a vertical direction via said adjusting elements.

* * * * *